(12) United States Patent
Kuwahata et al.

(10) Patent No.: US 11,738,697 B2
(45) Date of Patent: Aug. 29, 2023

(54) MOUNTING PART STRUCTURE OF EXTERNAL DETECTION SENSOR FOR VEHICLE

(71) Applicant: HONDA MOTOR CO., LTD., Tokyo (JP)

(72) Inventors: Shuhei Kuwahata, Tokyo (JP); Makoto Kurita, Tokyo (JP); Eiji Ishizuka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/671,626

(22) Filed: Feb. 15, 2022

(65) Prior Publication Data

US 2022/0314897 A1    Oct. 6, 2022

(30) Foreign Application Priority Data

Mar. 30, 2021  (JP) ................................ 2021-058316

(51) Int. Cl.
*B60R 11/04* (2006.01)
*B60R 1/12* (2006.01)
(Continued)

(52) U.S. Cl.
CPC ................ *B60R 11/04* (2013.01); *B60R 1/04* (2013.01); *B60R 1/12* (2013.01);
(Continued)

(58) Field of Classification Search
CPC .. B60R 11/04; B60R 1/04; B60R 1/12; B60R 2001/1253; B60R 2011/0033;
(Continued)

(56) References Cited

U.S. PATENT DOCUMENTS

| 8,770,644 B2 | 7/2014 | Harders et al. |
| 2013/0214548 A1* | 8/2013 | Harders .............. B60R 13/0212 296/24.34 |

(Continued)

FOREIGN PATENT DOCUMENTS

| JP | 2015-020695 | 2/2015 |
| JP | 2019-099048 | 6/2019 |

OTHER PUBLICATIONS

Japanese Office Action for Japanese Patent Application No. 2021-058316 dated Sep. 13, 2022.

*Primary Examiner* — Howard D Brown, Jr.
*Assistant Examiner* — Tyler B Edwards
(74) *Attorney, Agent, or Firm* — Amin, Turocy & Watson, LLP

(57) ABSTRACT

A mounting part structure of an external detection sensor for a vehicle includes a sensor cover. A front portion of the sensor cover is locked to the sensor bracket via a front locking part that restricts displacement in a vertical direction of the vehicle when displacement of the sensor cover in forward and rearward directions of the vehicle and a vehicle width direction and rotation thereof around an axis following the vehicle width direction are allowed. A rear portion of the sensor cover is locked to the console bracket via a rear locking part that restricts displacement of the sensor cover in the vertical direction of the vehicle and the forward and rearward directions of the vehicle when displacement of the sensor cover in the vehicle width direction is allowed. The rear portion of the sensor cover is biased in the vehicle width direction by a rear spring part.

3 Claims, 12 Drawing Sheets

(51) Int. Cl.
*B60R 1/04* (2006.01)
*B60R 11/00* (2006.01)

(52) U.S. Cl.
CPC ............... *B60R 2001/1253* (2013.01); *B60R 2011/0033* (2013.01); *B60R 2011/0059* (2013.01); *B60R 2011/0094* (2013.01)

(58) Field of Classification Search
CPC ..... B60R 2011/0059; B60R 2011/0094; B60R 11/00; B60R 2011/0026; B60R 2011/0063
See application file for complete search history.

(56) References Cited

U.S. PATENT DOCUMENTS

| | | | |
|---|---|---|---|
| 2015/0030319 A1* | 1/2015 | Matori | F16M 13/00 396/419 |
| 2019/0168671 A1* | 6/2019 | Higashimachi | B60R 1/12 |

* cited by examiner

MOUNTING PART STRUCTURE OF EXTERNAL DETECTION SENSOR FOR VEHICLE

CROSS-REFERENCE TO RELATED APPLICATION

Priority is claimed on Japanese Patent Application No. 2021-058316, filed on Mar. 30, 2021, the contents of which are incorporated herein by reference.

BACKGROUND

Field of the Invention

The present invention relates to a mounting part structure of an external detection sensor for a vehicle.

Background

In recent years, the number of vehicles equipped with external detection sensors such as cameras, infrared radars, ultrasonic sensors, and LIDERs has increased. There are various mounting locations of such external detection sensors in a vehicle, and mounting an external detection sensor on an upper portion of a windshield inside a vehicle is known (refer to, for example, U.S. Pat. No. 8,770,644).

In the vehicle described in U.S. Pat. No. 8,770,644, a sensor bracket is fixed to the upper portion of the windshield inside the vehicle by adhesion, and the external detection sensor (a camera) is mounted on the sensor bracket. The sensor bracket inside the vehicle is covered with a resin sensor cover. An overhead console equipped with an interior lighting switch and the like is supported via a console bracket at a front portion of a ceiling of the vehicle. The front side of the sensor cover is locked to the sensor bracket by a front locking part, and the rear side thereof is locked to a front edge portion of the console bracket by a rear locking part.

The front locking part allows displacement of a front portion of the sensor cover in the forward and rearward directions of the vehicle and the vehicle width direction, and rotational displacement around an axis in the vehicle width direction and also locks the front portion of the sensor cover to the sensor bracket in when the displacement of the front portion of the sensor cover in a vertical direction of the vehicle is restricted. Further, the rear locking part locks a rear portion of the sensor cover to the console bracket when displacement of a rear portion of the sensor cover in all directions is restricted. The mounting part structure of the external detection sensor described in U.S. Pat. No. 8,770,644 allows the sensor cover to be mounted while absorbing an assembly error of the windshield with the console bracket, manufacturing errors of components and the like by functions of the front locking part and the rear locking part, and also allows a rear edge portion of the sensor cover to be aligned with a front edge portion of the overhead console.

SUMMARY

The mounting part structure of the external detection sensor described in U.S. Pat. No. 8,770,644 is locked to the console bracket when the displacement of the rear portion of the sensor cover in all directions is restricted by the rear locking part. Thus, for example, if the sensor cover is long in the forward and rearward directions of the vehicle, or the like, there is concern that the sensor cover may be bent in the vehicle width direction when the rear portion of the sensor cover is mounted on the console bracket.

An aspect of the present invention provides a mounting part structure of an external detection sensor for a vehicle, which is capable of absorbing errors in each part, assembling a sensor cover to a sensor bracket and a console bracket and also aligning a rear edge portion of the sensor cover with a front edge portion of an overhead console when bending of the sensor cover in a vehicle width direction is prevented.

A mounting part structure of an external detection sensor for a vehicle according to one aspect of the present invention includes: an external detection sensor configured to detect information outside the vehicle through a windshield of the vehicle; a sensor bracket installed on a side surface of the windshield inside the vehicle and configured to hold the external detection sensor; a console bracket installed on a front portion of a ceiling part in a vehicle interior; an overhead console supported by the console bracket at the ceiling part in the vehicle interior; and a sensor cover configured to cover the external detection sensor and the sensor bracket from a vehicle interior side and of which a front portion side is locked to the sensor bracket and a rear edge portion is locked to the console bracket to be aligned with a front edge portion of the overhead console, wherein a front portion of the sensor cover is locked to the sensor bracket via a front locking part that restricts displacement in a vertical direction of the vehicle when displacement of the sensor cover in forward and rearward directions of the vehicle and a vehicle width direction and rotation thereof around an axis following the vehicle width direction are allowed, and a rear portion of the sensor cover is locked to the console bracket via a rear locking part that restricts displacement of the sensor cover in the vertical direction of the vehicle and the forward and rearward directions of the vehicle when displacement of the sensor cover in the vehicle width direction is allowed, the rear portion of the sensor cover being biased in the vehicle width direction by a rear spring part.

With such a configuration, the front portion side of the sensor cover is locked to the sensor bracket via the front locking part, and the rear portion side is locked to the console bracket via the rear locking part.

Only the displacement of the front side of the sensor cover in the vertical direction of the vehicle is restricted by the front locking part, and the displacement in the forward and rearward directions of the vehicle, the displacement in the vehicle width direction, and rotation around the axis following the vehicle width direction are allowed. Thus, when the front portion of the sensor cover is locked to the sensor bracket via the front locking part and then the rear portion of the sensor cover is locked to the console bracket by the rear locking part in that state, a position of the front portion side of the sensor cover in the forward and rearward directions of the vehicle and a position thereof in the vehicle width direction can be finely adjusted, and a tilted state thereof in the forward and rearward directions of the vehicle can be finely adjusted. Therefore, even when there is an assembly error of the windshield or the console bracket, or a manufacturing error of parts, the sensor cover can be assembled to the sensor bracket and the console bracket by absorbing the errors. Further, the displacement of the rear portion of the sensor cover in the vertical direction of the vehicle and the forward and rearward directions of the vehicle is restricted by the rear locking portion while the displacement in the vehicle width direction is allowed. At this time, since the rear portion of the sensor cover is biased in the vehicle width direction by the rear spring part, the position in the vehicle width direction can be finely adjusted against an elastic force of the rear spring part. Further, backlash of the rear portion of the sensor cover in the vehicle width direction can be suppressed by the elastic force of the rear spring part.

The front portion of the sensor cover may be biased in the vehicle width direction by a front spring part.

In this case, since the front portion of the sensor cover is biased in the vehicle width direction by the front spring part, the position of the front portion of the sensor cover in the vehicle width direction can be finely adjusted against the elastic force of the front spring part. Further, the backlash of the front portion of the sensor cover in the vehicle width direction can be suppressed by the elastic force of the front spring part.

A mirror base that supports a rearview mirror may be installed on the side surface of the windshield inside the vehicle, and the sensor cover may cover a base part of the mirror base and include a through hole through which a mirror support part of the mirror base is inserted.

In this case, since the base part of the mirror base is covered with the sensor cover, an exterior of the base part side of the rearview mirror can be improved. Further, since the position of the rear portion of the sensor cover can be adjusted in the vehicle width direction by the rear locking part and the rear spring part, the positional relationship between the mirror support part of the mirror base and the through hole of the sensor cover can be appropriately adjusted in the vehicle width direction.

In the mounting part structure of the external detection sensor for a vehicle according to the aspect of the present invention, when the sensor cover is installed on the sensor bracket and the console bracket, with the rear locking part as a reference, the position of the front portion side of the sensor cover in the forward and rearward directions of the vehicle and the vehicle width direction, and a tilt angle in the vertical direction can be finely adjusted by the front locking part. Therefore, the sensor cover can be easily installed on the sensor bracket and the console bracket by absorbing an assembly error and a manufacturing error of the parts. Further, in the mounting part structure of the external detection sensor for a vehicle according to the aspect of the present invention, since the rear portion of the sensor cover is biased in the vehicle width direction by the rear spring part, a rear edge portion of the sensor cover can be aligned with a front edge portion of the overhead console when bending of the sensor cover in the vehicle width direction is removed by finely adjusting the position in the vehicle width direction against the elastic force of the rear spring part.

DESCRIPTION OF EMBODIMENTS

Figure 1:
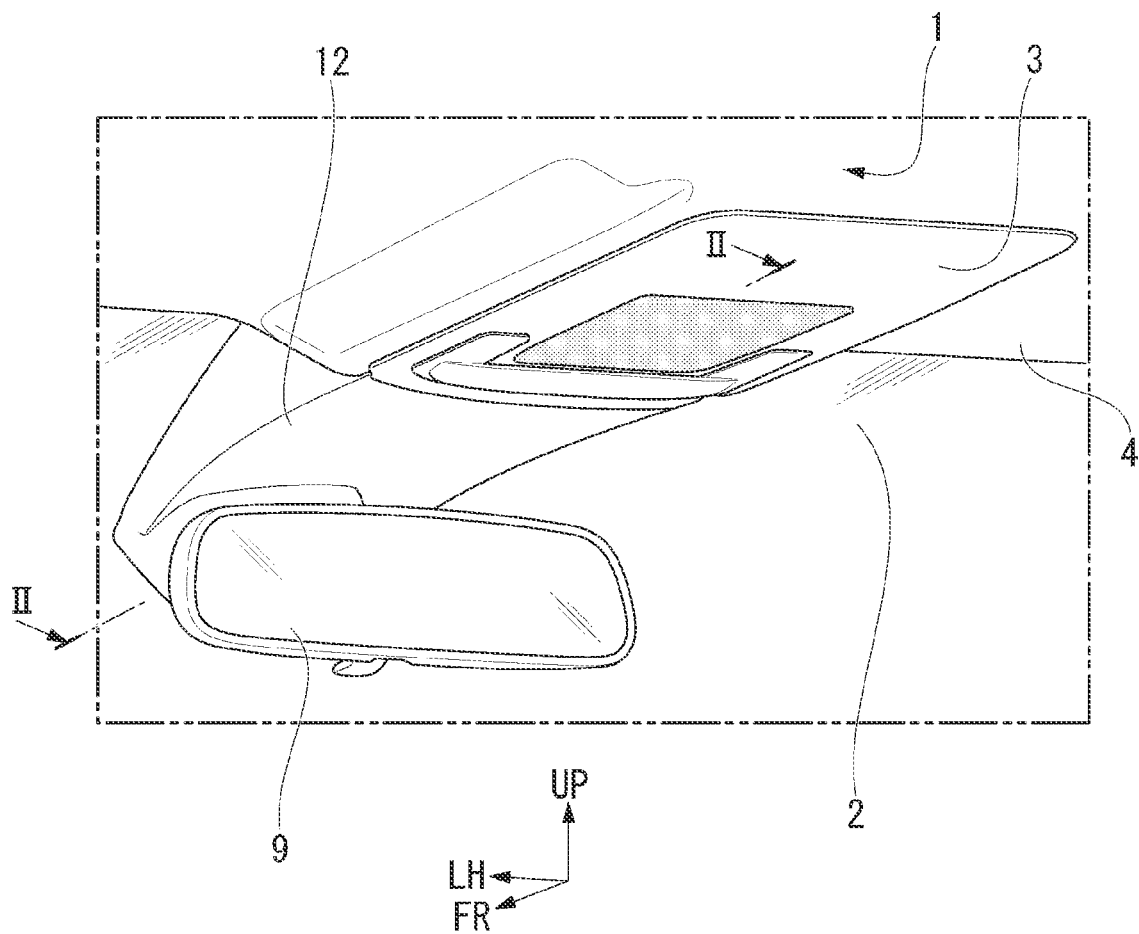
FIG. 1 is a perspective view showing a camera mounting part (a sensor mounting part) of an embodiment.

Hereinafter, embodiments of the present invention will be described with reference to the drawings. In the drawings, an arrow FR indicating a forward direction with respect to a vehicle, an arrow UP indicating an upward direction with respect to the vehicle, and an arrow LH indicating a leftward direction with respect to the vehicle are shown.

FIG. 1 is a perspective view showing a camera mounting part (a sensor mounting part) in a vehicle interior.

A reference numeral 1 in FIG. 1 is a ceiling part in the vehicle interior. A reference numeral 2 is a windshield disposed in front of a front seat in the vehicle interior. The windshield 2 is inclined diagonally downward from a front end portion of a roof part 5 (refer to FIG. 2) of the vehicle toward the front. An overhead console 3 equipped with an interior lighting switch or the like is installed at a center of a front portion of the ceiling part 1 in the vehicle interior. Further, a roof lining 4 is provided on a surface (a portion excluding the overhead console 3) of the ceiling part 1 facing the vehicle interior. The ceiling part 1 includes the roof lining 4 and a support member (not illustrated) that supports the roof lining 4.

Figure 2:
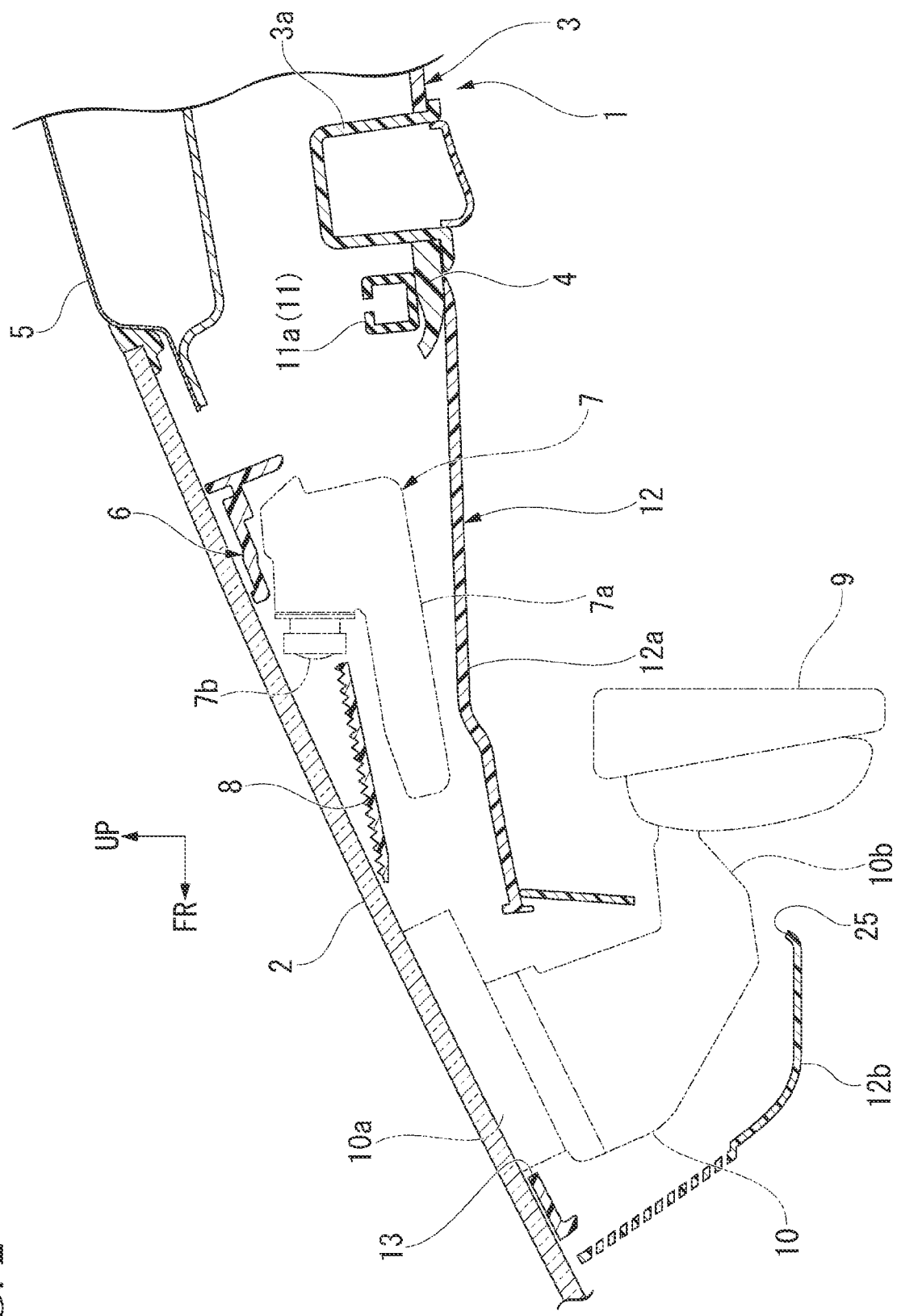
FIG. 2 is a cross-sectional view along line II-II of FIG. 1.
Figure 3:
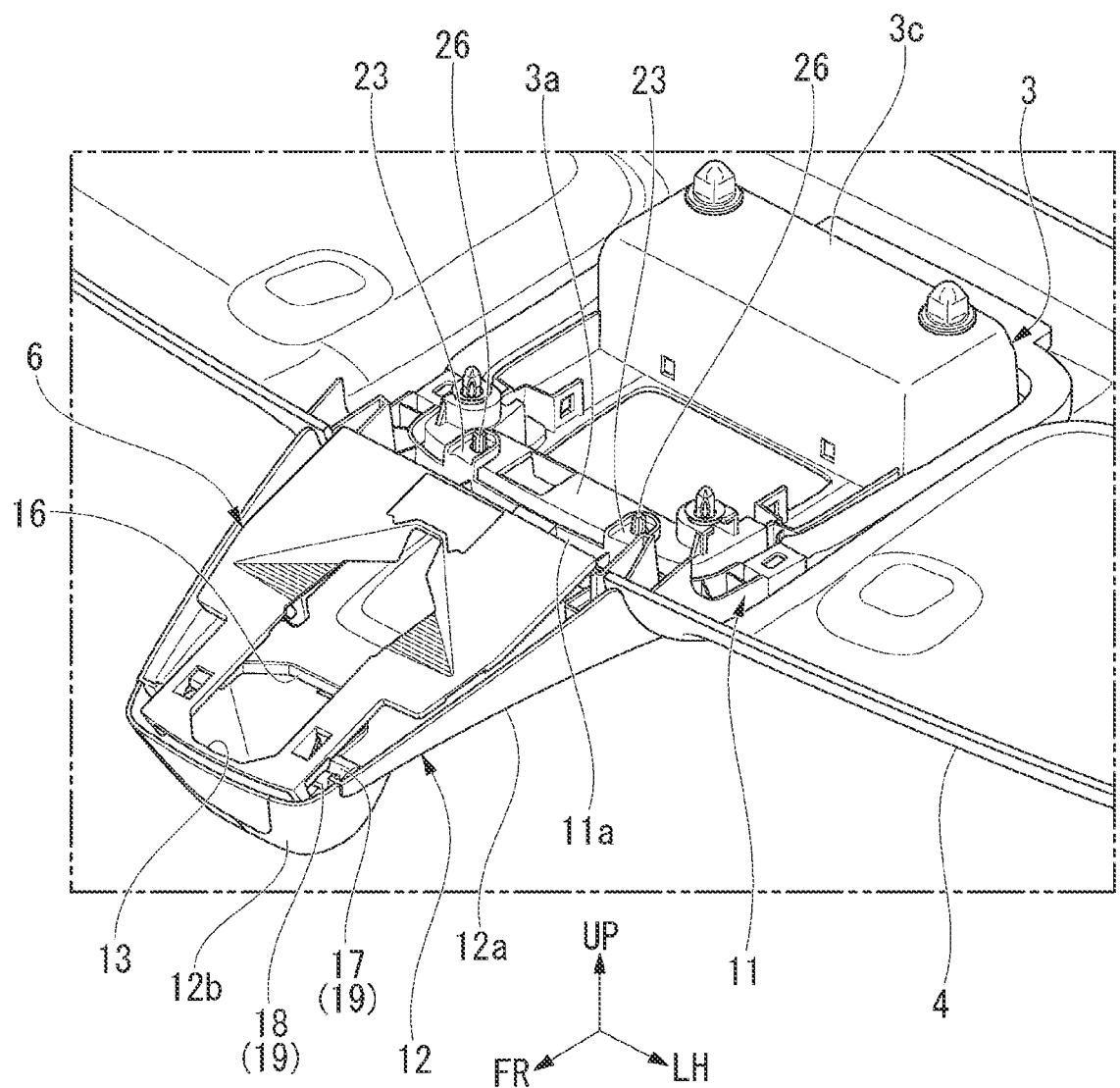
FIG. 3 is a perspective view from above of the camera mounting part of the embodiment that is removed from a vehicle.

FIG. 2 is a cross-sectional view along line II-II of FIG. 1. FIG. 3 is a perspective view from above of the camera mounting part (the sensor mounting part) removed from the vehicle together with the roof lining 4.

As illustrated in the drawings, a camera bracket 6 (a sensor bracket) is installed at an upper center of a side surface of the windshield 2 in the vehicle interior by adhesion. As illustrated in FIG. 2, a camera 7 which is a form of an external detection sensor for a vehicle is installed (held) in the camera bracket 6. A reference numeral 7a in FIG. 2 is a camera main body, and a reference numeral 7b is a lens part of the camera 7. The lens part 7b is directed toward the front side of the vehicle through the windshield 2. As illustrated in FIG. 2, a lens hood 8 that covers the lower front side of the lens part 7b is installed on the camera bracket 6, but in FIG. 3, part of the lens hood 8 is removed.

Further, as illustrated in FIG. 2, a mirror base 10 that supports a rearview mirror 9 is installed at a center of an upper portion of the side surface of the windshield 2 in the vehicle interior by adhesion. The mirror base 10 includes a base part 10a that is adhesively fixed to the windshield 2 and a mirror support part 10b that extends from an extending end on the lower side of the base part 10a toward the rear side of the vehicle. The base part 10a of the mirror base 10 is installed on the windshield 2 on the front side of a mounting part of the camera 7 in the camera bracket 6. An opening 13 through which the base part 10a of the mirror base 10 passes vertically is provided in a front edge portion of the camera bracket 6.

A rectangular frame-shaped console bracket 11 is installed at the center of a front end portion of the ceiling part 1. A main body of the overhead console 3 is disposed in the frame of the console bracket 11. The overhead console 3 is installed on a support member (not illustrated) of the ceiling part 1 together with the console bracket 11.

The camera bracket 6 and the vehicle interior side of the camera 7 installed at the camera bracket 6 are covered with a camera cover 12 (a sensor cover) made of a resin. The camera cover 12 is installed at (locked to) the camera bracket 6 and the console bracket 11 as described in detail later.

Figure 4:
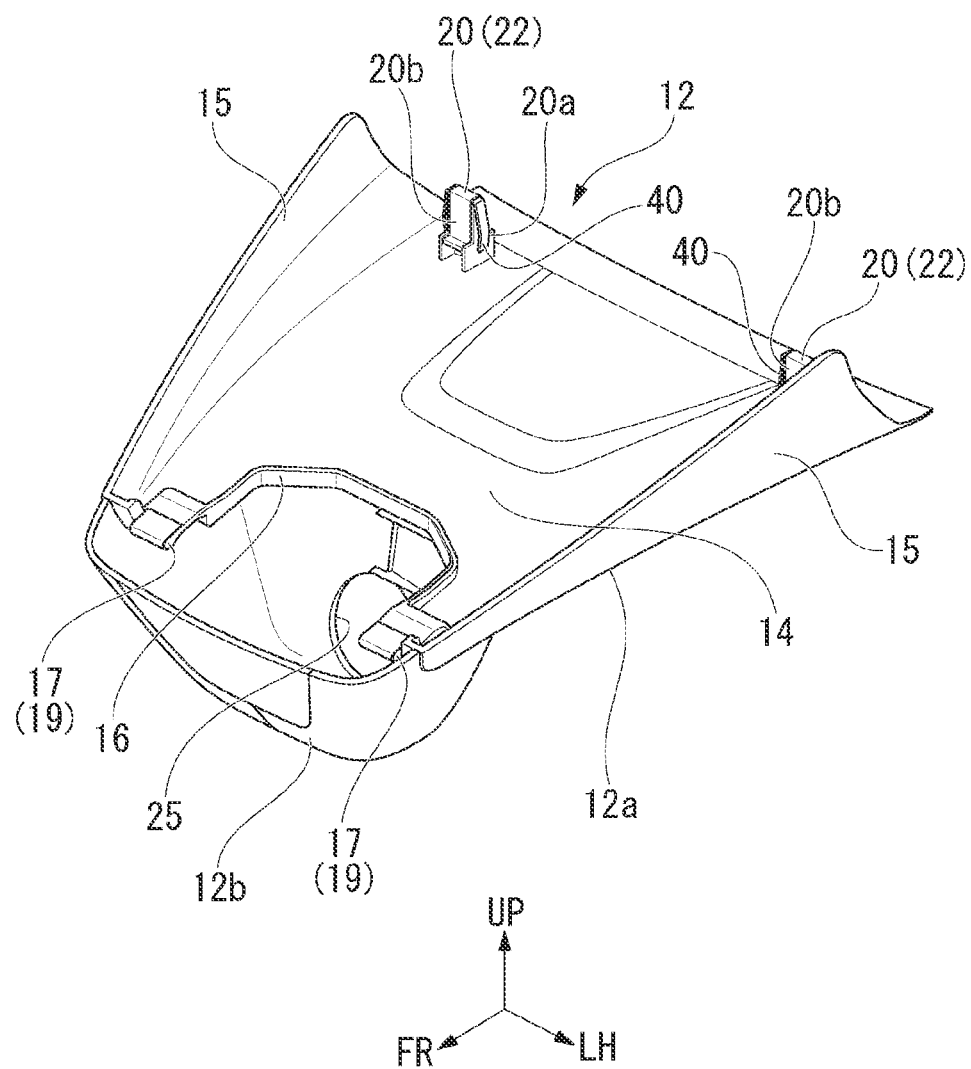
FIG. 4 is a perspective view of a camera cover (a sensor cover) of the embodiment when seen from above.

FIG. 4 is a perspective view of the camera cover 12 when seen from above.

The camera cover 12 includes a cover main body 12a that covers main portions of the camera 7 and the camera bracket 6, and a base cover part 12b that covers the periphery of the base part of the mirror base 10. The cover main body 12a has a lower wall 14 having a substantially trapezoidal shape in a top view, and a pair of side walls 15 that extend upward from left and right side ends of the lower wall 14. A lower surface of the lower wall 14 is substantially horizontal when the camera cover 12 is installed on the vehicle body via the camera bracket 6 and the console bracket 11. The lower wall 14 is formed in a substantially trapezoidal shape in which a width in a vehicle width direction gradually increases from a front end portion to a rear end portion. A cutout part 16 that is recessed toward the rear side of the vehicle is provided on a front side of the lower wall 14. The base part 10a of the mirror base 10 that extends downward from the windshield 2 is inserted through the cutout part 16.

Substantially rectangular locking claws 17 that extend toward the front side of the vehicle extend on edge portions on both sides of the cutout part 16 in the front side of the lower wall 14 of the camera cover 12. Each of the locking claws 17 constitutes a front locking part 19 in the present embodiment together with a clamping block 18 on the camera bracket 6 side which will be described later. A pair of protruding parts 20 that project upward are provided on a rear edge portion of the lower wall 14. The pair of protruding parts 20 protrude at two positions on the rear edge portion of the lower wall 14 that are separated from each other in the vehicle width direction (two positions symmetrical with respect to a central portion in the vehicle width direction). Each of the protruding parts 20 constitutes a rear locking part 22 in the present embodiment together with a locking hole 21 on the console bracket 11 side which will be described later.

The front side of the camera cover 12 is locked to the camera bracket 6 by the front locking part 19, and the rear side thereof is locked to the console bracket 11 by the rear locking part 22.

As illustrated in FIGS. 2 and 4, the base cover part 12b is formed to have a substantially bowl shape that opens upward. Substantially latter half of an upper end of the base cover part 12b is joined to a lower surface of the lower wall 14 of the cover main body 12a. The opening at the upper end of the base cover part 12b and the cutout part 16 of the cover main body 12a form an insertion hole through which the base part 10a of the mirror base 10 is inserted. Further, a through hole 25 through which the mirror support part 10b of the mirror base 10 is inserted is formed in a rear wall part near a bottom portion of the base cover part 12b.

Figure 5:
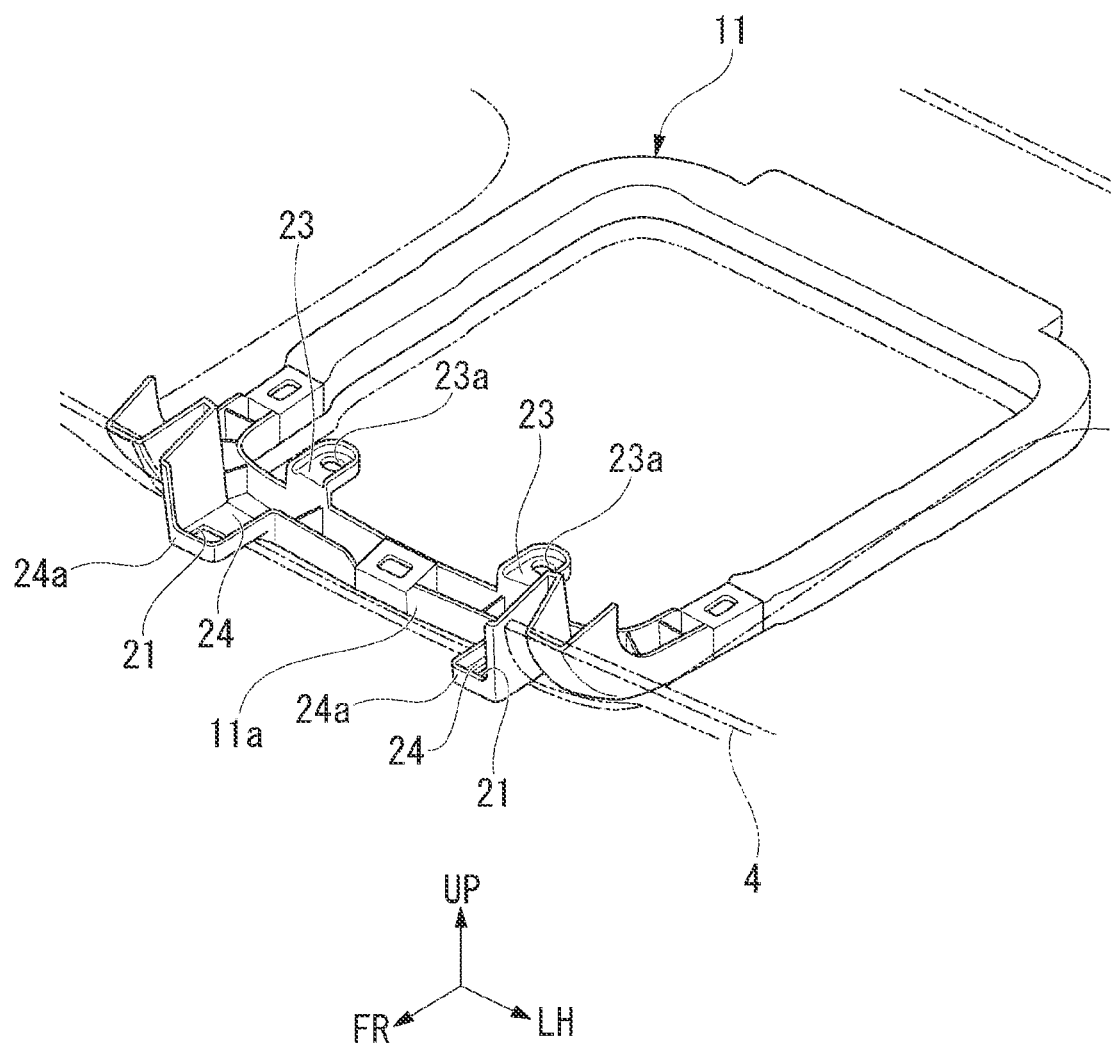
FIG. 5 is a perspective view of a console bracket of the embodiment when seen from above.

FIG. 5 is a perspective view of the console bracket 11 when seen from above.

The console bracket 11 is formed to have a rectangular frame shape as a whole, and appropriate portions on four sides are fixed to the support member of the ceiling part 1 by screwing or the like. A pair of rear connecting walls 23 that extend from an upper end of a front side 11a toward the rear side of the vehicle extend on the front side 11a of the console bracket 11 that extends in the vehicle width direction. The pair of rear connecting walls 23 are provided at two positions on the front side 11a that are separated from each other in the vehicle width direction (two positions symmetrical with respect to a central portion in the vehicle width direction). A locking hole 23a that passes therethrough in the vertical direction is formed in each of the rear connecting walls 23.

Further, a pair of front connecting walls 24 that extend from the upper end of the front side 11a toward the front side of the vehicle are extended on the front side 11a of the console bracket 11. The pair of front connecting walls 24 are provided at two positions on the front side 11a that are separated from each other in the vehicle width direction (two positions symmetrical with respect to the central portion in the vehicle width direction). Each of the front connecting walls 24 is formed to have a substantially rectangular shape in a plan view, and a reinforcing wall 24a that stands upward protrudes from the front side thereof and the left and right lateral sides thereof. Further, a substantially rectangular locking hole 21 into which the protruding part 20 of the camera cover 12 described above is inserted is formed in each of the front connecting walls 24.

Figure 6:
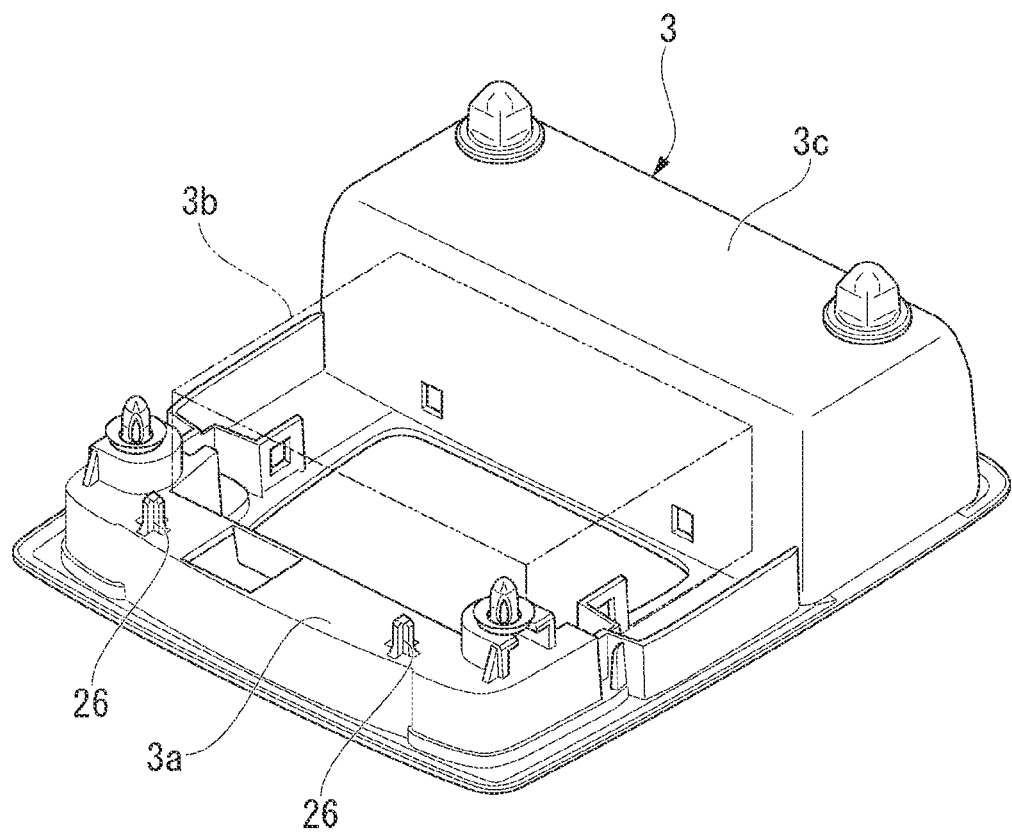
FIG. 6 is a perspective view of an overhead console of the embodiment when seen from above.
Figure 6:
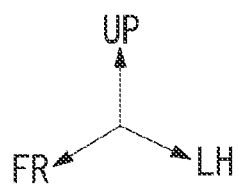

FIG. 6 is a perspective view of the overhead console 3 when seen from above.

In the overhead console 3, a light accommodating part 3a that accommodates a map light, an electrical component accommodating part 3b that accommodates electrical components, and a glass holder part 3c that accommodates sunglasses and the like are provided on the upper side of an operation part facing the vehicle interior. The light accommodating part 3a extends in the vehicle width direction. A pair of locking protrusions 26 are provided on an upper surface of the light accommodating part 3a to be spaced apart from each other in the vehicle width direction. The light accommodating part 3a, the electrical component accommodating part 3b, and the glass holder part 3c are accommodated inside a frame part of the console bracket 11. At this time, the pair of locking protrusions 26 that protrude from the upper surface of the light accommodating part 3a are fitted into the respective locking holes 23a formed in the pair of rear connecting walls 23 of the console bracket 11. Thus, the overhead console 3 is positioned relative to the console bracket 11. In this state, the overhead console 3 is fixed to the console bracket 11 by screwing or the like.

Figure 7:
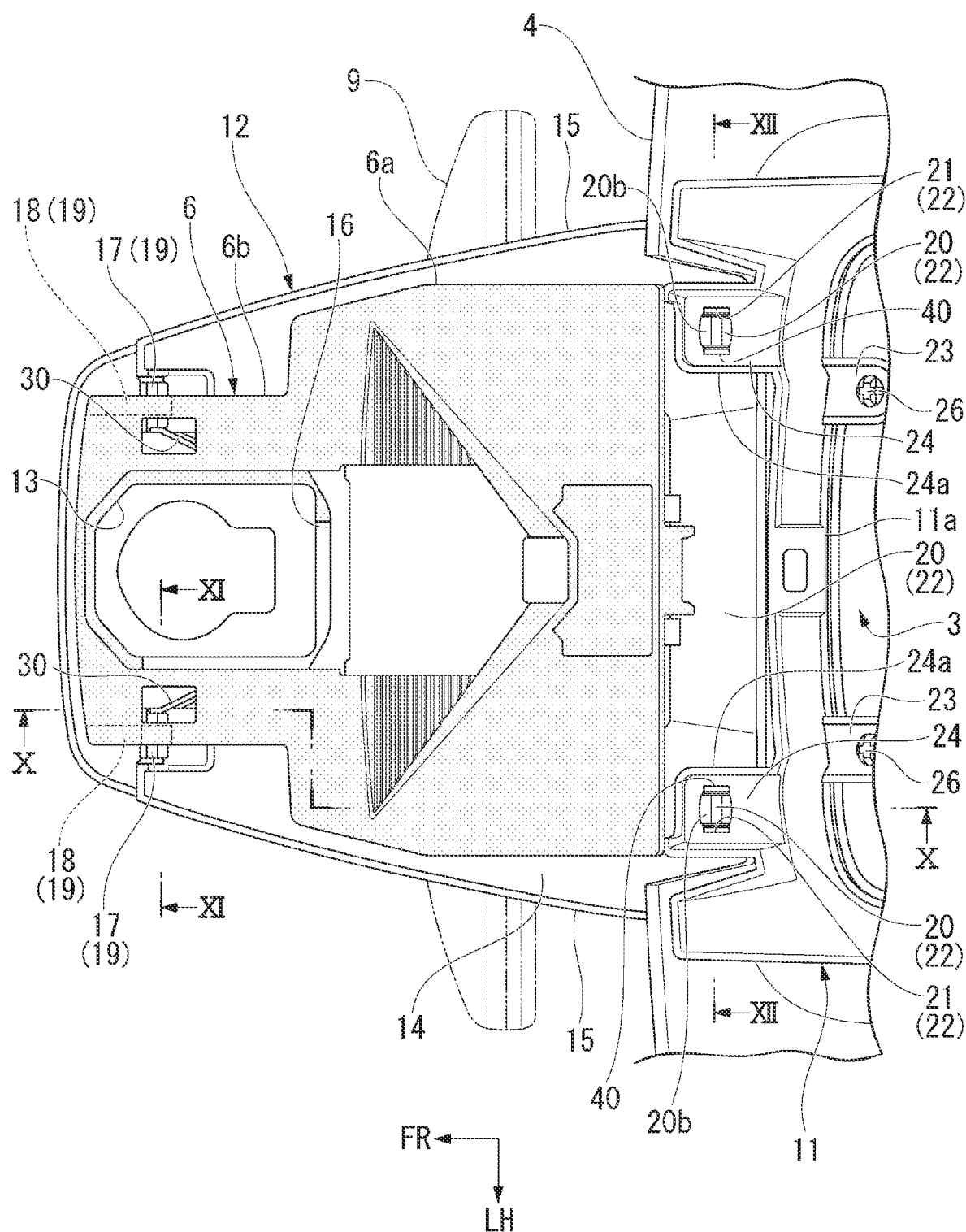
FIG. 7 is a view of the camera mounting part of the embodiment when seen from above.
Figure 8:
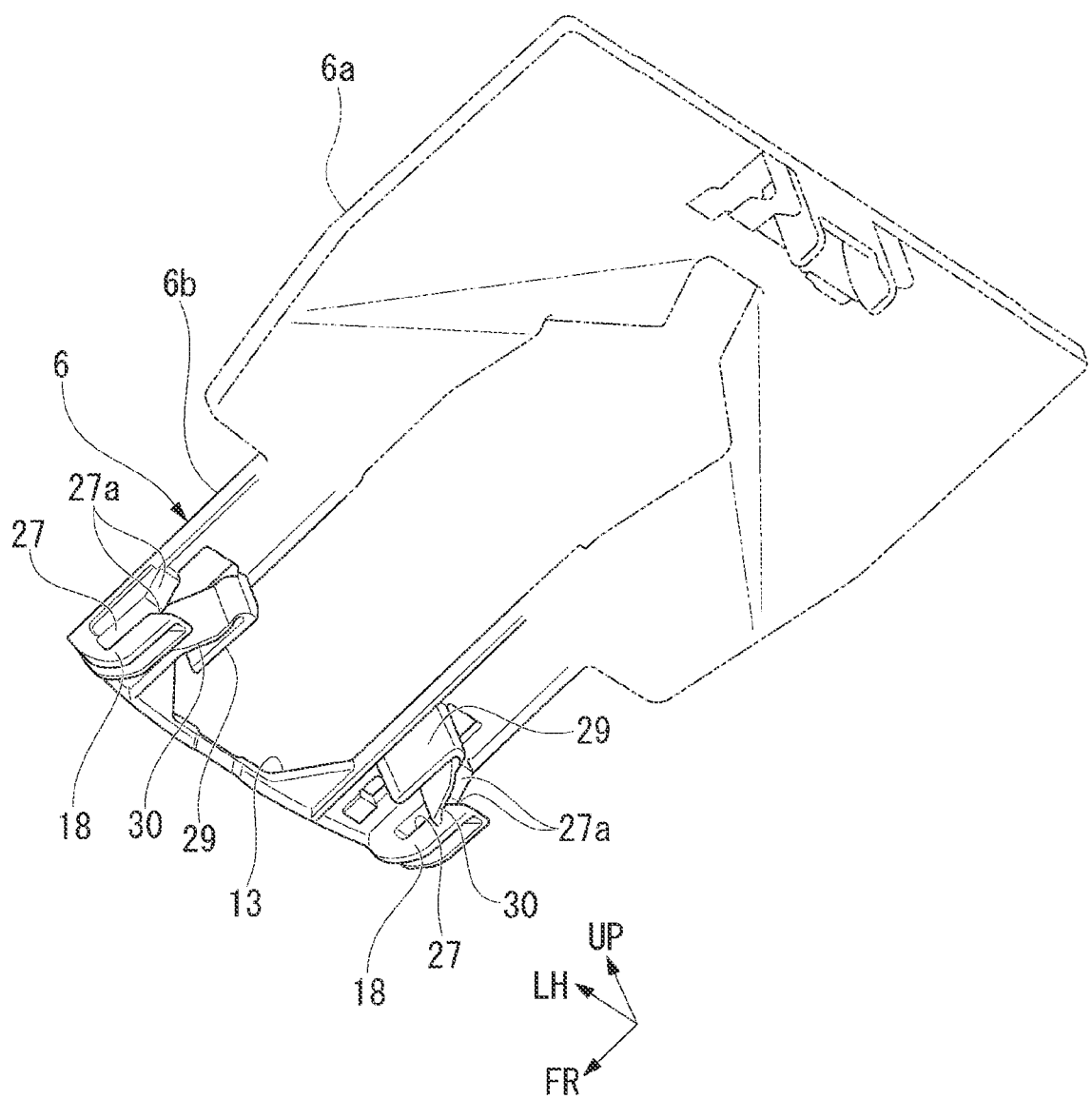
FIG. 8 is a perspective view of a camera bracket (a sensor bracket) of the embodiment when seen from below.
Figure 9:
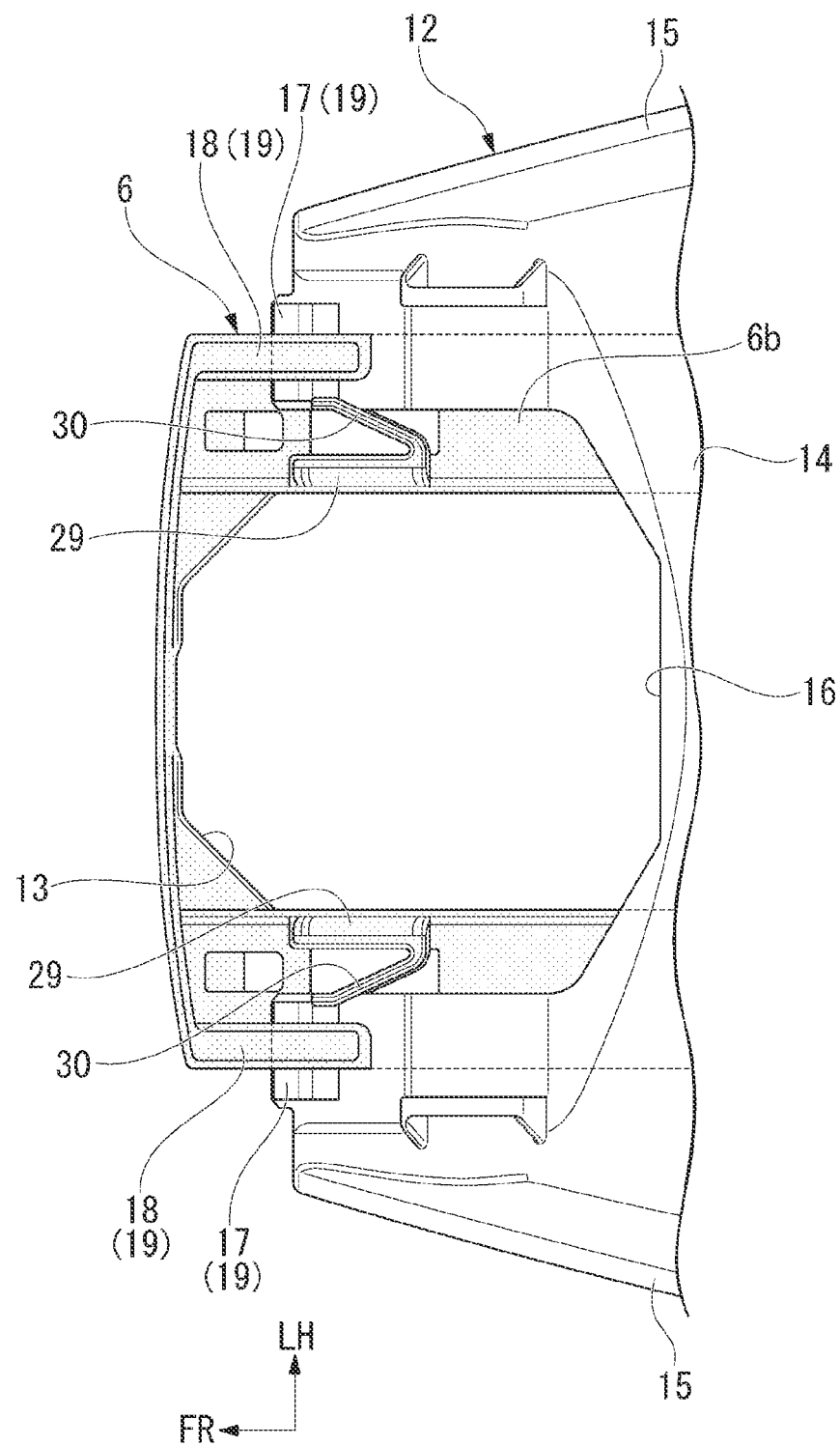
FIG. 9 is a bottom view with some components of the camera mounting part of the embodiment removed.
Figure 10:
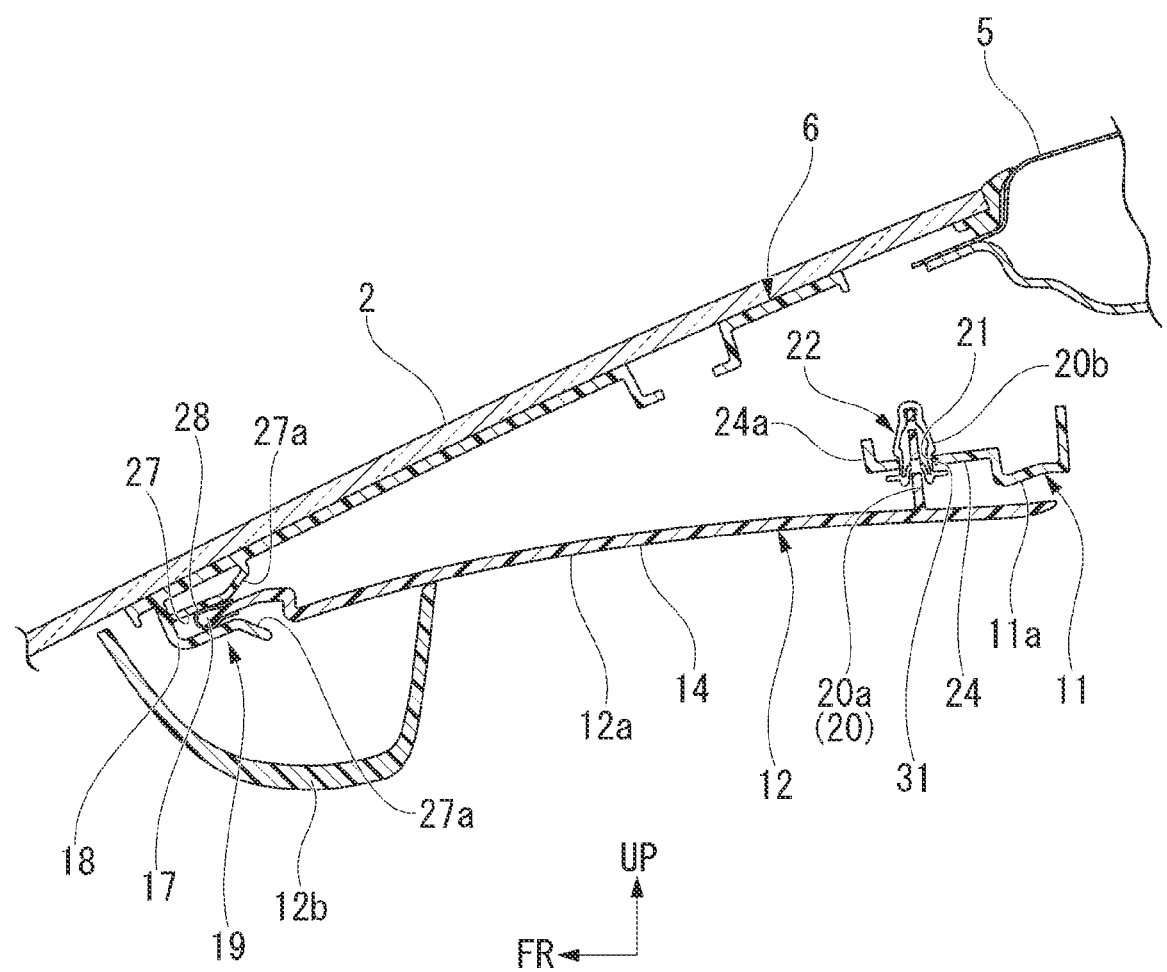
FIG. 10 is a cross-sectional view along line X-X of FIG. 7.
Figure 11:
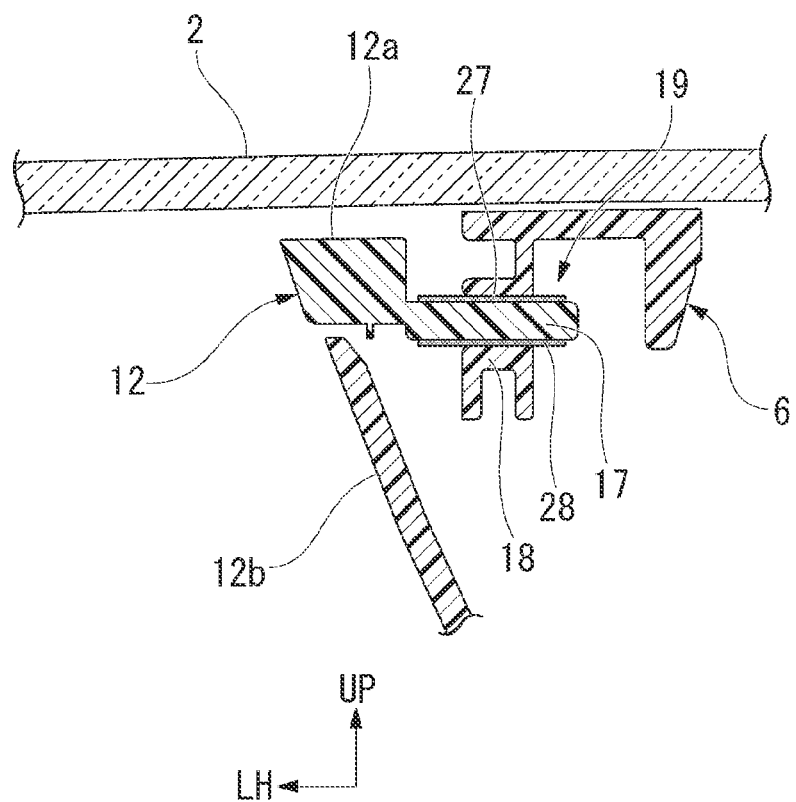
FIG. 11 is a cross-sectional view along line XI-XI of FIG. 7.
Figure 12:
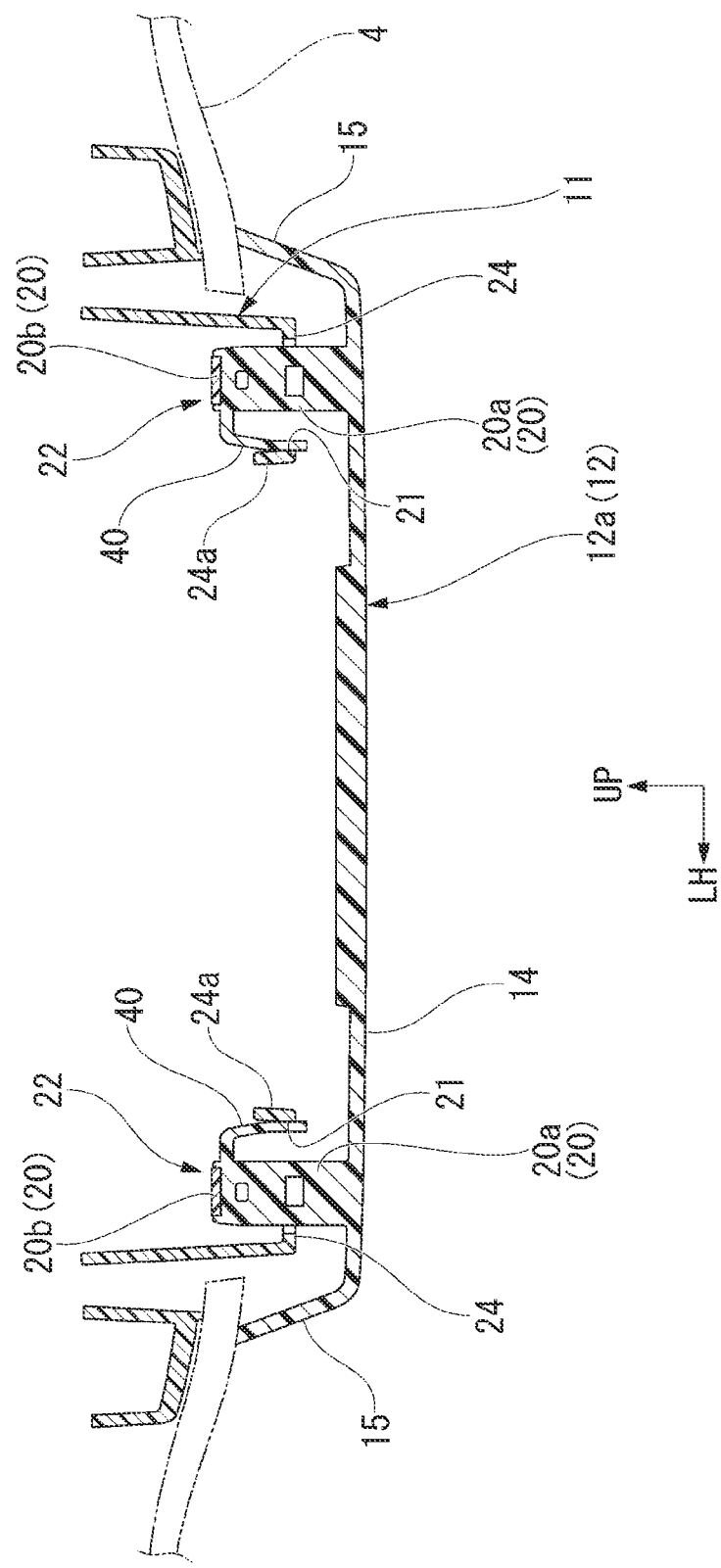
FIG. 12 is a cross-sectional view along line XII-XII of FIG. 7.

FIG. 7 is a view of the camera mounting part removed from the vehicle and seen from above. FIG. 8 is a view of the front portion of the camera bracket 6 when seen from below. Further, FIG. 9 is a view of the camera mounting part seen from below when the base cover part 12b of the camera bracket 6 is removed. FIGS. 10 to 12 are cross-sectional views of each of the parts of the camera mounting part of FIG. 7. FIG. 10 is a cross-sectional view along line X-X of FIG. 7. FIG. 11 is a cross-sectional view along line XI-XI of FIG. 7. FIG. 12 is a cross-sectional view along line XII-XII of FIG. 7.

The camera bracket 6 includes a wide bracket main body 6a that holds the camera 7 and a narrow front bulging part 6b that extends forward from the bracket main body 6a. The above-described opening 13 through which the base part 10a of the mirror base 10 passes is formed in the front bulging part 6b.

The clamping block 18 having a substantially U shape in a side view is integrally provided on left and right side edge portions of a lower surface of the front bulging part 6b in the vicinity of the front end portion of the opening 13. A holding groove 27 that extends in the vehicle width direction and is open toward the rear side of the vehicle is formed in each of the clamping blocks 18. Further, as illustrated in FIG. 10, a tapered surface 27*a* is provided vertically at an end portion of the holding groove 27 on the rear side of the vehicle so that a vertical width gradually increases toward the rear side of the vehicle. The left and right corresponding locking claws 17 provided on the cover main body 12*a* of the camera cover 12 are slidably inserted into the holding grooves 27 of the left and right clamping blocks 18 (refer to FIGS. 10 and 11). A sliding member 28 having small slip resistance is adhered to a tip end portion of each of the locking claws 17. Displacement of a front portion of the camera cover 12 in the vehicle vertical direction is restricted by inserting the left and right locking claws 17 of the camera cover 12 into the corresponding holding grooves 27 on the camera bracket 6 side while displacement thereof in the forward and rearward directions of the vehicle and the vehicle width direction is allowed. Further, since the tapered surface 27*a* is provided at an end portion of the holding groove 27 on the rear side of the vehicle so that the vertical width gradually increases toward the rear side of the vehicle, at this time, the front end portion of the camera cover 12 is allowed to slightly rotate around an axis following the vehicle width direction.

Further, a support wall 29 that protrudes downward protrudes in an inner region of each of the left and right clamping blocks 18 in the vehicle width direction on a lower surface of the front bulging part 6*b*. A plate-shaped piece 30 that extends diagonally outward in the vehicle width direction toward the front side of the vehicle protrudes from the support wall 29. When the locking claw 17 of the camera cover 12 is engaged with the holding groove 27 on the camera bracket 6 side, a tip end portion of the plate-shaped piece 30 comes into contact with a vicinity of a base part of the locking claw 17 from an inner side in the vehicle width direction with an elastic action.

In the present embodiment, the plate-shaped piece 30 constitutes a front spring part that biases the front portion of the camera cover 12 in the vehicle width direction.

Here, as illustrated in FIGS. 10 and 12, the pair of protruding parts 20 that protrude from the rear edge portion of the camera cover 12 includes a base protrusion 20*a* that protrudes from the lower wall 14 of the camera cover 12 and a clip part 20*b* installed on the base protrusion 20*a*. The clip part 20*b* has a concave engaging part 31 that restricts the displacement in the forward and rearward directions of the vehicle and the vertical direction of the vehicle by fitting to an edge of the corresponding locking hole 21 of the console bracket 11. The displacement of the rear portion of the camera cover 12 in the forward and rearward directions of the vehicle and the vertical direction of the vehicle is restricted by fitting the concave engaging part 31 of the protruding part 20 into the corresponding locking hole 21. Further, the width of a portion of the base protrusion 20*a* that is inserted into the locking hole 21 (a width in the vehicle width direction) is set to be sufficiently narrower than a width of the locking hole 21 (a width in the vehicle width direction). Therefore, the displacement of the rear portion of the camera cover 12 in the vehicle width direction is allowed.

Further, as illustrated in FIG. 12, a plate-shaped piece 40 that extends inward in the vehicle width direction and then bends diagonally downward is integrally provided at an upper end of an inner portion of each of the left and right base protrusions 20*a* in the vehicle width direction. A lower end of the plate-shaped piece 40 is inserted into the corresponding locking hole 21. The plate-shaped piece 40 comes into contact with an inner edge portion of the locking hole 21 in the vehicle width direction with an elastic action. In the present embodiment, the plate-shaped piece 40 constitutes a rear spring part that biases the rear portion of the camera cover 12 in the vehicle width direction.

The plate-shaped piece 40 provided on the protruding part 20 on the left side in FIG. 12 is disposed on the right side of the base protrusion 20*a*, and the plate-shaped piece 40 provided on the protruding part 20 on the right side is disposed on the left side of the base protrusion 20*a*. Therefore, the two plate-shaped pieces 40 are disposed on opposite sides in the vehicle width direction with the protruding part 20 interposed therebetween. In the present embodiment, although each of the plate-shaped pieces 40 is integrally provided inside the corresponding base protrusion 20*a* in the vehicle width direction, each of the plate-shaped pieces 40 may be integrally provided outside the corresponding base protrusion 20*a* in the vehicle width direction.

When the camera mounting part is actually mounted on a vehicle body, first, the camera bracket 6 that holds the camera 7 and the mirror base 10 are fixed to the side surface of the windshield 2 in the vehicle interior by adhesion, and the console bracket 11 and the overhead console 3 are installed on the ceiling part 1 in the vehicle interior. Then, the camera cover 12 is installed on the camera bracket 6 and the console bracket 11 to cover the camera 7 and the camera bracket 6 from the vehicle interior side. At this time, first, the front portion of the camera cover 12 is locked to the camera bracket 6 by the front locking part 19, and then the rear portion of the camera cover 12 is locked to the console bracket 11 by the rear locking part 22.

The front locking part 19 only restricts the displacement of the front portion of the camera cover 12 in the vertical direction of the vehicle and allows the displacement of the front portion of the camera cover 12 in the forward and rearward directions of the vehicle and the vehicle width direction, and a tilt displacement in the forward and rearward directions. Thus, when the rear portion of the camera cover 12 is locked to the console bracket 11 by the rear locking part 22, an assembly work can be performed while a position and a tilt angle of the front portion side of the camera cover 12 are finely adjusted.

Although both the front portion side and the rear portion side of the camera cover 12 can be displaced in the vehicle width direction, the front portion side is biased in the vehicle width direction by the plate-shaped piece 30, and the rear portion side is similarly biased in the vehicle width direction by the plate-shaped piece 40. Thus, in a situation in which the camera cover 12 is bent in the vehicle width direction during assembly, the bending of the camera cover 12 can be removed by finely adjusting positions of the front portion and the rear portion of the camera cover 12 in the vehicle width direction against an elastic force of the plate-shaped pieces 30 and 40.

As described above, in the structure of the camera mounting part of the present embodiment, when the camera cover 12 is installed on the camera bracket 6 and the console bracket 11, with the rear locking part 22 as a reference, the position of the front portion side of the camera cover 12 in the forward and rearward directions of the vehicle and the vehicle width direction, and the tilt angle in the vertical direction can be finely adjusted by the front locking part 19. Therefore, the camera cover 12 can be easily installed on the camera bracket 6 and the console bracket 11 by absorbing an assembly error and a manufacturing error of the parts.

Further, in the structure of the camera mounting part of the present embodiment, the rear portion of the camera cover 12 is biased in the vehicle width direction by the plate-shaped piece 40 which is the rear spring part. Therefore, the rear edge portion of the camera cover 12 can be aligned with the front edge portion of the overhead console 3 when the bending of the camera cover 12 in the vehicle width direction is removed by finely adjusting the position in the vehicle width direction against the elastic force of the plate-shaped piece 40. Further, in the present embodiment, since the rear portion of the camera cover 12 is biased by the plate-shaped piece 40 in the vehicle width direction, backlash of the rear portion of the camera cover 12 in the vehicle width direction can be suppressed by the elastic force of the plate-shaped piece 40.

Further, in the structure of the camera mounting part of the present embodiment, the front portion of the camera cover 12 is biased in the vehicle width direction by the plate-shaped piece 30 which is the front spring part. Therefore, the position of the front portion of the camera cover 12 in the vehicle width direction can be finely adjusted against the elastic force of the plate-shaped piece 30 which is the front spring part. Further, the backlash of the front portion of the camera cover 12 in the vehicle width direction can be suppressed by the elastic force of the plate-shaped piece 30.

Further, in the case of the present embodiment, a pair of left and right plate-shaped pieces 30 which are front spring parts are provided, and the elastic force of the pair of plate-shaped pieces 30 is set to act in a direction opposite to the vehicle width direction. Therefore, even when the front portion of the camera cover 12 is displaced to either the left or right side in the vehicle width direction during the assembly of the camera cover 12, a reaction force (a supporting force) due to the plate-shaped pieces 30 can be stably obtained. Therefore, when such a configuration is adopted, it is possible to further suppress the backlash of the front portion of the camera cover 12 in the vehicle width direction.

Further, in the structure of the camera mounting part of the present embodiment, the mirror base 10 is installed on the side surface of the windshield 2 inside the vehicle, and the camera cover 12 covers the base part 10a of the mirror base 10. Additionally, a through hole 25 through which the mirror support part 10b is inserted is provided in a portion that covers the base part 10a of the mirror base 10. With such a configuration, the base part 10a of the mirror base 10 can be covered with the camera cover 12, and an exterior of the base part side of the rearview mirror 9 can be improved. Further, in the present embodiment, since the position of the camera cover 12 can be adjusted in the vehicle width direction, a positional relationship between the mirror support part 10b and the through hole 25 of the camera cover 12 can be appropriately adjusted in the vehicle width direction.

The present invention is not limited to the above embodiment, and various design changes can be made without departing from the gist thereof. For example, in the above embodiment, although the camera 7 is adopted as an example of the external detection sensor for a vehicle, the external detection sensor for a vehicle is not limited to the camera 7 and may be an infrared radar, an ultrasonic sensor, a LIDER, or the like.

What is claimed is:

1. A mounting part structure of an external detection sensor for a vehicle, comprising:
    an external detection sensor configured to detect information outside the vehicle through a windshield of the vehicle;
    a sensor bracket installed on a side surface of the windshield inside the vehicle and configured to hold the external detection sensor;
    a console bracket installed on a front portion of a ceiling part in a vehicle interior;
    an overhead console supported by the console bracket at the ceiling part in the vehicle interior; and
    a sensor cover configured to cover the external detection sensor and the sensor bracket from a vehicle interior side and of which a front portion side is locked to the sensor bracket and a rear edge portion is locked to the console bracket to be aligned with a front edge portion of the overhead console,
    wherein a front portion of the sensor cover is locked to the sensor bracket via a front locking part that restricts displacement in a vertical direction of the vehicle when displacement of the sensor cover in forward and rearward directions of the vehicle and a vehicle width direction and rotation thereof around an axis following the vehicle width direction are allowed, and
    a rear portion of the sensor cover is locked to the console bracket via a rear locking part that restricts displacement of the sensor cover in the vertical direction of the vehicle and the forward and rearward directions of the vehicle when displacement of the sensor cover in the vehicle width direction is allowed, the rear portion of the sensor cover being biased in directions opposite to each other in the vehicle width direction by a plurality rear spring parts.

2. The mounting part structure of the external detection sensor for a vehicle according to claim 1,
    wherein the front portion of the sensor cover is biased in the vehicle width direction by a front spring part.

3. The mounting part structure of the external detection sensor for a vehicle according to claim 1,
    wherein a mirror base that supports a rearview mirror is installed on the side surface of the windshield inside the vehicle, and
    the sensor covers a base part of the mirror base and comprises a through hole through which a mirror support part of the mirror base is inserted.

* * * * *